US 6,647,712 B2

(12) United States Patent
Hiller et al.

(10) Patent No.: US 6,647,712 B2
(45) Date of Patent: Nov. 18, 2003

(54) METHOD AND APPARATUS FOR EXHAUST GAS POSTTREATMENT IN INTERNAL COMBUSTION ENGINES

(75) Inventors: Burkhard Hiller, Oberriexingen (DE); Andreas Glenz, Kernen I.R. (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/193,294

(22) Filed: Jul. 12, 2002

(65) Prior Publication Data

US 2003/0024237 A1 Feb. 6, 2003

(30) Foreign Application Priority Data

Jul. 19, 2001 (DE) .......................... 101 35 303

(51) Int. Cl.$^7$ ................................. F01N 3/00
(52) U.S. Cl. ..................... 60/289; 60/274; 60/285; 60/292; 123/90.15; 123/90.19; 180/65.3; 477/201
(58) Field of Search ................. 60/274, 285, 287, 60/288, 289, 290, 292, 293; 123/90.15, 90.19; 180/65.2, 65.3; 477/201, 202, 200

(56) References Cited

U.S. PATENT DOCUMENTS

| | | | | |
|---|---|---|---|---|
| 5,233,831 A | * | 8/1993 | Hitomi et al. ................ 60/284 |
| 5,293,741 A | * | 3/1994 | Kashiyama et al. .......... 60/284 |
| 5,655,498 A | * | 8/1997 | Suzuki et al. ............... 123/308 |
| 5,778,857 A | * | 7/1998 | Nakamura et al. ..... 123/406.37 |
| 5,848,529 A | * | 12/1998 | Katoh et al. .................. 60/274 |

* cited by examiner

Primary Examiner—Thomas Denion
Assistant Examiner—Binh Tran
(74) Attorney, Agent, or Firm—Ronald E. Greigg

(57) ABSTRACT

A method and an apparatus for posttreatment of exhaust gases of internal combustion engines after an engine operation includes an intake system and an exhaust gas treatment system with an exhaust gas catalytic converter. Secondary air that originates in an air source can be delivered to the exhaust gas treatment system at a first secondary air inlet. After an engine operation, with the exhaust gas catalytic converter at operating temperature, the throttle device in the intake system is closed. After the engine operation, the engine is shut off in a phase relationship in which inlet/outlet valves of at least one combustion chamber of the engine are open. By means of the air source, an air flow is generated, which discharges at a further inlet point in the intake system of the engine and flows through or bathes the components in the direction of the exhaust gas catalytic converter at operating temperature in the exhaust gas treatment system.

10 Claims, 2 Drawing Sheets

METHOD AND APPARATUS FOR EXHAUST GAS POSTTREATMENT IN INTERNAL COMBUSTION ENGINES

BACKGROUND OF THE INVENTION

1. Field of the Invention

In modern internal combustion engines, which must meet ever more stringent exhaust gas standards for emissions in both the United States and Europe, in motor vehicles with Otto engines, electrically operated secondary air pumps that can be switched on selectively are used. The secondary air pump is used for exhaust gas posttreatment and shortly after engine starting is activated for a period of between 30 and 60 seconds. During the starting phase, by the admixture of air with the exhaust gas, a thermal postcombustion is brought about, with the purpose of heating up the catalytic converter in the exhaust system faster and increasing its conversion rates.

2. Description of the Prior Art

From the Bosch publication "*Otto-Motoren-Management, Grundlagen und Komponenten*" [Fundamentals and Components of Otto Engine Management], Gelbe Reihe [Yellow Series], 2001 Edition, *Technische Unterrichtung* [Technical Instruction], page 82, it is known by thermal postcombustion to subject the uncombusted ingredients of the fuel-air mixture that are still present to a postcombustion. If the mixture composition is lean, the requisite oxygen is still contained in the exhaust gas in the form of residual oxygen, since it was not converted during the combustion. However, in a rich mixture, of the kind often required for cold starting internal combustion engines, air (secondary air) introduced additionally into the exhaust conduit can speed up the heating of the catalytic converter. The resultant exothermic reaction on the one hand reduces the uncombusted hydrocarbons and the carbon monoxide, but on the other, the postcombustion also heats up the exhaust gas catalytic converter and brings it to its operating temperature, which enables optimal conversion, more quickly. The optimal conversion rate can thus be reached faster in the warmup phase of the engine, and thus the operating readiness of the catalytic converter is achieved quite fast.

However, it has been found that in intake engines, a considerable portion of uncombusted hydrocarbons (HCs) in the exhaust gas are the product of the preceding engine operation of the engine and are deposited as a film on the wall of the intake tube, or are generated by outgassing from the valves, in particular the valve plates, or involve HC-laden residual gas located upstream of the catalytic converter. These hydrocarbon molecules stay upstream of the exhaust system so long that the next time the engine is started, they are forced in the direction of the catalytic converter. In cold starting, several strokes of the cylinders elapse before the engine starts, and thus this HC-laden residual exhaust gas gets into the cold catalytic converter. There, the HC-laden residual exhaust gas is stored temporarily, and some of it even directly reaches the environment, since the catalytic converter is not yet activated.

With an ensuing temperature increase in the catalytic converter to the dew point, even the HC-laden residual exhaust gas stored temporarily in the catalytic converter reaches the environment uncombusted. Activating the secondary air pump during the starting phase of the engine has no influence on these events described above.

OBJECT AND SUMMARY OF THE INVENTION

In operation of an internal combustion engine by the method proposed according to the invention, a further reduction in uncombusted hydrocarbons in the exhaust gas can be attained, because the HC residues in the exhaust gas are combusted in the still-hot catalytic converter after an engine operation by supplied secondary air. The residual heat of the catalytic converter can thus be exploited for postcombustion of uncombusted hydrocarbons in the exhaust gas.

An air flow is generated, which transports the HC molecules, adhering to the intake tube, valve plates, and cylinder walls, upstream of the throttle valve through the engine up to the hot catalytic converter. To generate this air flow, both the secondary air pump and a 2/2-way valve can be used. Downstream of the throttle valve, the air flow is introduced into the intake tube in the direction of the inlet valves; the throttle valve is in its closing position, to prevent the secondary air flow generated from escaping in the direction of the air filter. In the engine, in the best case all the inlet and outlet valves of the cylinders are open. In conventional valve control systems in internal combustion engines, an open position of inlet/outlet valves can be achieved at at least one of the cylinders, so that the air flows in the direction of the catalytic converter and becomes enriched with uncombusted HCs.

Besides by the use of a secondary air pump in an internal combustion engine, an air flow can also be generated by providing that the engine is merely turned over by the starter/starter-generator, creating an air flow that flows through the cylinders. For trucks, an air flow in the direction of the catalytic converter can be generated by tapping the compressed air reserve of the brake system.

BRIEF DESCRIPTION OF THE DRAWING

The invention will be better understood and further objects and advantages thereof will become more apparent from the ensuing detailed description of preferred embodiments taken in conjunction with the drawing, in which.

DESCRIPTION OF THE PREFERRED EMBODIMENTS

Figure 1:
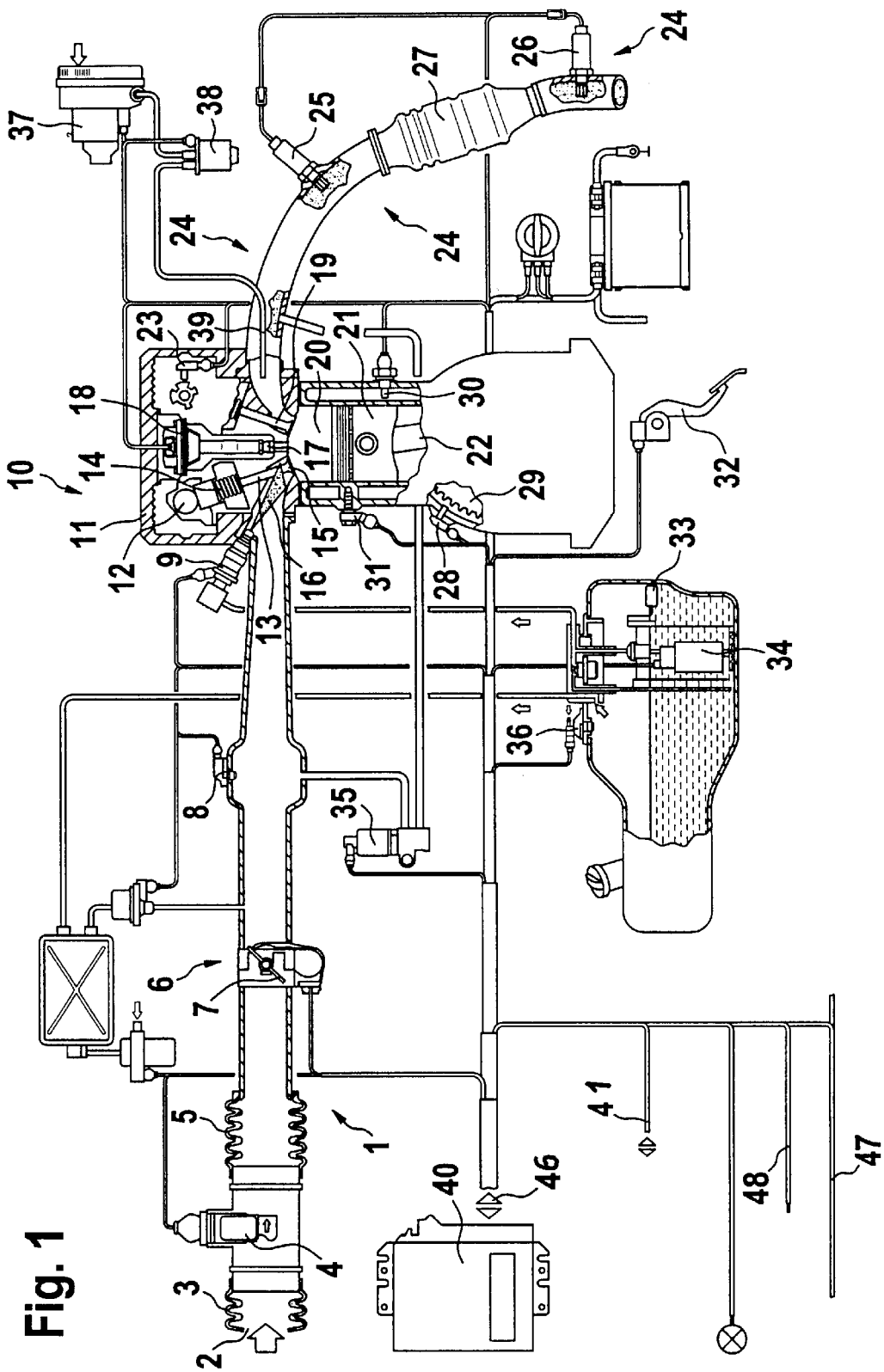
FIG. 1 shows the disposition of a secondary air pump and other components in an internal combustion engine.

FIG. 1 shows the disposition of a secondary air pump and other components in an internal combustion engine.

The internal combustion engine is assigned an intake system 1, which includes an intake opening 2 through which the ambient air required for combustion is aspirated. An air flow rate meter 4 is received between two cuffs 3 and 5 provided in the intake system. Downstream of the cuff 5 that is downstream of the air flow rate meter 4, a throttle device 6 is provided, which includes a throttle valve 7 that opens or closes the free flow cross section of the intake system 1. The throttle valve 7 can be triggered electrically, for instance, and via a communication with a multidirectional data bus 41, 47, it communicates with a control unit 40, not addressed in detail here, that is assigned to the engine. The throttle device 6 in the intake system 1 of the engine is followed downstream by an intake tube pressure sensor 8. The intake tube pressure sensor 8 is received in a widened cross-sectional region of the intake system 1. Discharging into this region is a feed line, which branches off downstream of an exhaust gas recirculation valve 35. The exhaust gas recirculation valve 35 likewise communicates with the control unit via a data bus.

In the region of its cylinder head 11, the engine 10 has a valve control 12, with which inlet and outlet valve assigned to the various combustion chambers 20 of the engine 10 are controlled. The inlet valves shown in FIG. 1 include a valve tappet 13 and a valve plate 15 received on it, as well as a valve spring 14. Disposed in the cylinder head region 11 between the inlet valves 13,15 and outlet valves 19 is an ignition coil 18, which is connected to a spark plug 17 disposed below it and protruding with its ignition electrode into the combustion chamber 20. Below the inlet valve, comprising the valve tappet 13 and the valve plate 15, a fuel distributor or injection valve 9 is received, which communicates with a fuel tank module 33 via a lead line. The injection cone emerging from the injection valve or fuel distributor 9 is identified by reference numeral 16.

Inside the combustion chamber 20 of the engine 10, a piston 21 received on a connecting rod 22 moves up and down; via the connecting rod 22, the vertical reciprocating motion of the piston 21 in the combustion chamber 20 is converted into a rotary motion of a disk flywheel 29. To ascertain the phase relationship of the disk flywheel 29, this flywheel is provided on its outer circumferential surface with a pattern of teeth that is scanned by rpm transducers 28. By means of a knocking sensor 31, the combustion proceeding in the combustion chamber 20 is monitored. The knocking sensor 31 likewise communicates with the control unit 40 of the engine via the data bus.

Also assigned to the combustion chamber 20 of the engine 10 is a temperature sensor 30, with which the temperature of the coolant of the engine 10 is monitored.

Also received in the cylinder head region 11 of the engine 10 is a phase transducer 23, with which the rotary position of the engine is monitored and which likewise communicates with the control unit 40 via the data bus. Depending on the phase relationship of the engine 10 detected, upon engine starting the definition of the ignition sequence and the definition of the injection sequences in accordance with the ignition sequence are effected via the control unit 40. Below the phase transducer 23, the outlet valve 19 of the combustion chamber 20 is shown, by way of which the exhaust gas combusted in the combustion chamber 20 flows into an exhaust gas treatment system 24. The exhaust gas treatment system 24 includes a catalytic converter 27, which serves to clean the exhaust gases. Upstream of the exhaust gas catalytic converter 27, a first $\lambda$ sensor 25 is received in the exhaust gas treatment system 24; a second $\lambda$ sensor 26 is also located downstream of the exhaust gas catalytic converter 27 in the exhaust gas treatment system 24. Both $\lambda$ sensors communicate via connecting lines with the data bus 41, 47 assigned to the engine. The proportion of oxygen still present in the exhaust gas is ascertained by both $\lambda$ sensors 25 and 26 and reported back to the control unit 20, so that a suitable mixture preparation can be accomplished in the intake system 1 or upon injection into the combustion chamber 20. A return line for the exhaust gas branches off from the exhaust gas treatment system 24 to the exhaust gas recirculation valve 35, by way of which exhaust gas can be returned to the intake system 1 of the engine.

The internal combustion engine shown schematically in FIG. 1 is also assigned an air source, in the form of a secondary air pump 37. The secondary air pump 37 cooperates with a secondary air valve 38, by way of which air is carried into the exhaust gas treatment system 24. The location of discharge of the secondary air supply is marked 39 and is located directly downstream of the outlet valve 19 in the cylinder head region 11 of the engine 10. With this arrangement of a supplementary air source, known from the prior art, a thermal postcombustion was set in motion before the onset of a given engine operation, by the admixture of air, with the purpose of heating the exhaust gas catalytic converter 27 faster, and thus of assuring faster operational readiness and adequate conversion rates in the catalytic converter.

Figure 2:
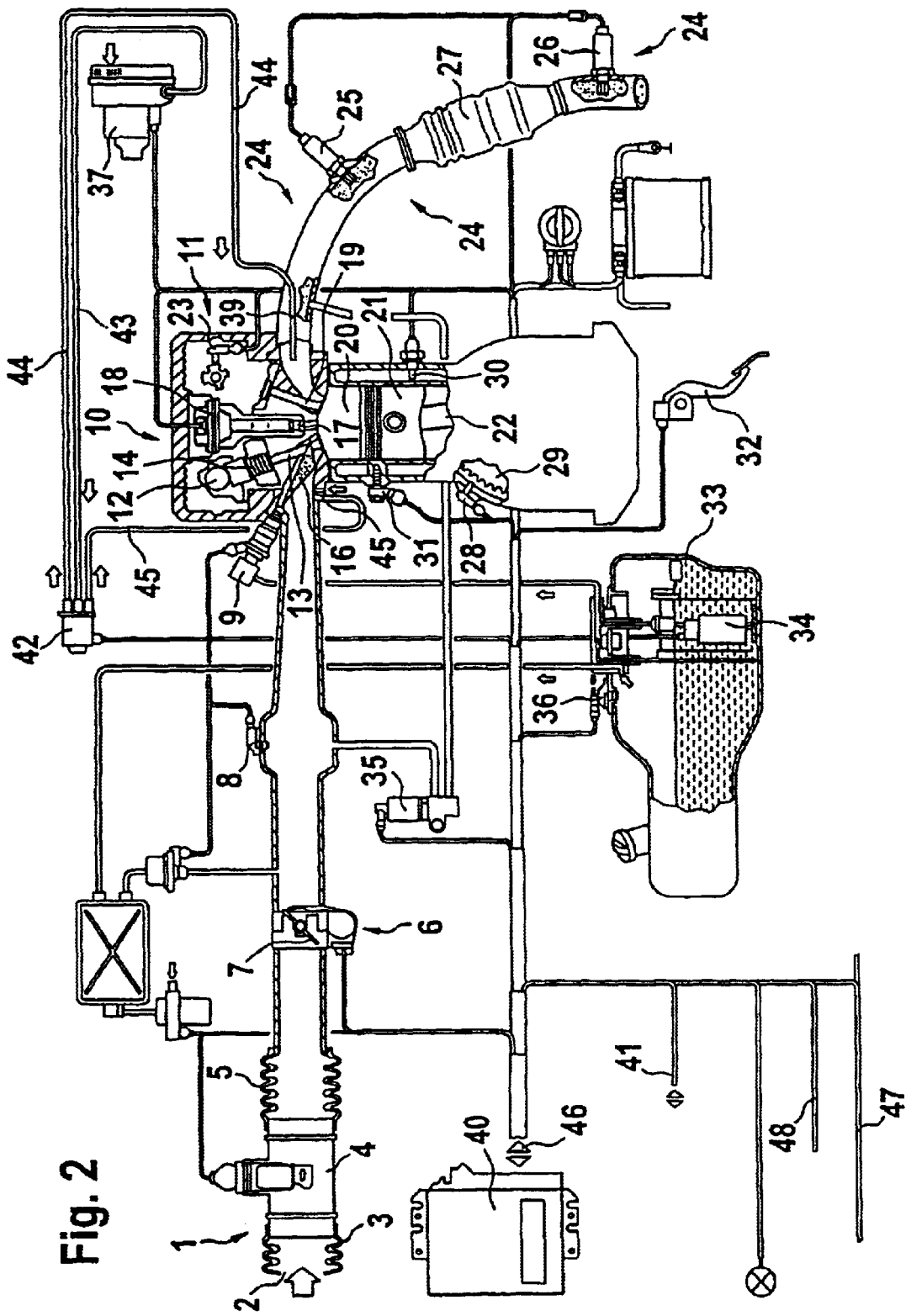
FIG. 2 shows the blowing in of a-secondary air flow in the intake system shortly upstream of the inlet valves in the cylinder head region of the engine.

FIG. 2 shows the generation of a secondary air flow in the intake system shortly upstream of the inlet valves in the cylinder head region of the engine.

In a distinction from what FIG. 1 shows, the additional air source, in the form of a secondary air pump 37 with an electric drive disposed independently of the engine 10, communicates via a secondary air supply line 43 with a 2/2-way valve 42. A first secondary air supply inlet line 44 branches off from the 2/2-way valve 42 and discharges in the exhaust gas treatment system 24 immediately downstream of the outlet valve 19 of the cylinder head region 11 of the engine 10. A second secondary air supply inlet line 45 also branches from the 2/2-way valve 42; its discharge point is located in the intake system 1 of the engine. In the exemplary embodiment shown in FIG. 2, the discharge point of the second secondary air inlet 45 is in the immediate vicinity of the fuel distributor or injection valve 9. Both the secondary air pump 37 and the 2/2-way valve 42 communicate via line connections with the control unit 40 of the engine 10. Via a data bus 41, 47, data can be exchanged between the individual components of the engine and the control unit 40; the data flow is bidirectional. Among other elements, the control unit 40 has a diagnostic interface 46 and a connection 48 with an immobilizer, not shown here, which is meant to prevent unauthorized persons from starting the engine 10. The data bus 41, 47 can be embodied as a CAN, for example, and assures problem-free data exchange between the components of the engine 10 and the control unit 40.

The engine 10 as shown in FIG. 2 can be equipped with a camshaft-controlled valve control 12; a variant design comprises a valve control 12 that is independent of the crankshaft for the inlet and outlet valves in the cylinder head region 11 of the engine 10.

Once the engine is shut off, the exhaust gas catalytic converter 27 received in the exhaust gas treatment system 24 is essentially still at its operating temperature. By means of the control unit 40, triggering of the throttle device 6 received in the intake system 1 is effected, thus rotating the throttle valve 7 into its closing position and closing off the intake system 1 from the environment. Also after being shut off, the engine 10 assumes a preferential position relative to its phase relationship, such that with camshaft-controlled valve control 12, at least the inlet valves 13, 15 and the outlet valve 19 of at least one combustion chamber 20 of the engine 10 are opened. After that, triggering of the additional air source, designed for instance as a secondary air pump, is effected, so that via both the first secondary air inlet 44 and the second secondary air inlet 45, an air flow is generated, which after discharging into the intake system 1 tears off and entrains hydrocarbons (HCs) that have adhered to the wall of the intake tube as well as HC molecular concentrations occurring by outgassing from the valve plates 15 and HC-laden residual exhaust gas located upstream of the exhaust gas catalytic converter 27 after the engine 10 has been shut off and transports them from the intake system 1 through the components listed of the engine 10 into the exhaust gas treatment system 24 and into the exhaust gas catalytic converter 27, which is still at its operating temperature. By activation of the additional air source 37 for a period of 30 to 60 seconds after a preceding engine operation, HC-laden residual exhaust gas can therefore be combusted in the still operationally ready exhaust gas catalytic converter 27 and thus converted.

The air flow, which after the engine operation is delivered to the intake system 1 of the engine 10 at a second secondary air inlet 45, can also be obtained by tapping a compressed-air reservoir of a vehicle brake system, as is done for instance in trucks beyond a certain permissible total weight. The method proposed according to the invention is especially promoted by the fact that as many inlet valves 13,15 and outlet valves 19 of the engine 10 as possible are in the their open position, so that the generated air flow can bathe the components that outgas HCs and is thus capable of feeding the HC molecules in the direction of the exhaust gas catalytic converter 27 which is still at operating temperature.

In internal combustion engines that have a valve control 12 independent of the crank drive system, it is possible in a simple way, via a suitable triggering of the inlet valves 13,15 and outlet valves 19 in the cylinder head region 11 of the engine 10, to have all the inlet and outlet valves of the combustion chambers 20 of the engine 10 open, so that the generated air flow can flow through them and feed the HC-laden residual gas into the exhaust gas catalytic converter 27. In conventional camshaft-controlled valve controls 12, the preferential position in which at least at one combustion chamber 20 the inlet or outlet valve 19 is open can be ascertained by the phase transducer 23 and stored in memory in the control unit 40. This preferred phase relationship is assumed by the engine after an engine operation, before the additional air source 37—whether it is a compressed-air reservoir of a vehicle brake system or is an electrically driven secondary air pump—is triggered by the control unit 40.

A further possibility after an engine operation of generating an air flow that flows through or bathes the components of the engine is to perform turning over of the engine via a starter/starter—generator, with the ignition output blocked and the fuel delivery blocked. In this way, an air flow through the individual combustion chambers 20 of the engine is generated by opening and closing inlet valves 13, 15 and outlet valves 19, as a result of which HC-laden residual exhaust gas can be delivered to the exhaust gas catalytic converter 27, which is still at operating temperature, in the exhaust gas treatment system 24. There, the HC molecules fed are converted; moreover, HC-laden residual exhaust gas located upstream of the exhaust gas catalytic converter is postcombusted in the exhaust gas catalytic converter 27.

In the variant embodiments sketched for the concept on which the invention is based, the position of the second secondary air inlet 45 in the intake system 1 can be selected freely. If the orifice of the second secondary air inlet 45 is located immediately downstream of the throttle device 6 in the intake system 1, then the maximum possible volume—for example of the wall film in the intake tube—can be fed out of the intake system, combustion chamber, and the components bathed by the air flow into the exhaust gas treatment system 24, so that the maximum possible conversion of HC molecular concentrations is possible in the exhaust gas catalytic converter 27, which is still at its operating temperature after a preceding engine operation.

The foregoing relates to preferred exemplary embodiments of the invention, it being understood that other variants and embodiments thereof are possible within the spirit and scope of the invention, the latter being defined by the appended claims.

We claim:

1. A method for treating gases of internal combustion engines after an engine operation, in which the engine (10) includes an intake system (1) and an exhaust gas treatment system (24) with an exhaust gas catalytic converter (27) and a valve control (12), and the exhaust gas treatment system (24) can be supplied at a first secondary air inlet (39) with secondary air from an air source (37), comprising the following method steps:

closing the intake system to the outside after an engine operation and with the catalytic converter (27) still at operating temperature, shutting off the engine (10) after an engine operation in a phase relationship, in such a way that inlet/outlet valves (13, 15; 19) of at least one combustion chamber (20) are open;

generating an air flow after an engine operation by means of the air source (37), which air flow is carried in the intake system (1) of the engine (10) to a second inlet point (45), and flowing the air through or bathing the components (1, 13, 15, 20, 19 and 24) of the engine in the direction of the catalytic converter (27) at operating temperature.

2. The method of claim 1 wherein the air flow in the intake system (1) is introduced between a throttle device (6) and the cylinder head region (11) of the engine (10).

3. The method of claim 1 wherein the engine includes camshaft-controlled valve control (12), and where the engine (10), after an engine operation, is shut off in a preferential position stored in memory in a control unit (40), in which position the inlet/outlet valves (13, 15; 19) of at least one combustion chamber (20) are open.

4. The method of claim 1 wherein the engine includes independent valve control (12), and wherein the inlet/outlet valves (13, 15; 19), after an engine operation, of all the combustion chambers (20) of the engine (10) are placed in their open position.

5. The method of claim 1 wherein a secondary air pump (37) is used as the air source.

6. The method of claim 1 wherein the compressed-air reservoir of a vehicle brake system is used as the air source.

7. The method of claim 1 comprising the steps of blocking the ignition and fuel delivery, and producing the air flow through the engine (10) by turning the engine over by means of a starter/starter-generator.

8. An apparatus for performing the method of claim 1 wherein the internal combustion engine (10) comprises an air source (37) which acts on a multi-way valve (42) into which a secondary air supply line (43) discharges and from which a first secondary air inlet (44) branches off into the exhaust gas treatment system (27), and a second secondary air inlet (45) discharging into the intake system (1) of the engine (10).

9. The apparatus of claim 8 wherein the air source is a secondary air pump (37).

10. The apparatus of claim 8 wherein the air source (37) is the compressed-air reservoir of a vehicle brake system.

* * * * *